Oct. 31, 1961  G. C. BATLEY  3,006,682
SLIDABLE WINDOW FOR VEHICLE
Filed Jan. 6, 1959

G.C. BATLEY
INVENTOR

BY E.C. McRae
J.R. Faulkner
J.J. Roethel
ATTORNEYS

United States Patent Office 3,006,682
Patented Oct. 31, 1961

3,006,682
SLIDABLE WINDOW FOR VEHICLE
George C. Batley, Solihull, Birmingham, England, assignor to Ford Motor Company, Dearborn, Mich., a corporation of Delaware
Filed Jan. 6, 1959, Ser. No. 785,256
Claims priority, application Great Britain July 17, 1958
5 Claims. (Cl. 296—44.5)

This invention relates to slidable windows for motor vehicles.

Frameless or semi-frameless motor vehicle doors usually rely on legs attached to bottom of glass, protruding down into the door and operating in the glass channels to support the door glass.

This existing method of supporting the door glass does not entirely overcome the lateral movement of the glass when in its uppermost position.

It is an object of the invention to overcome this deficiency.

The invention consists of a slidable window for a motor vehicle door comprising a side support channel and a slidable window mounted in a glazing channel from end to end of that side and supported by the support channel in the fully open and in the fully closed position.

Preferably the window is supported within the channel by spaced bearings of a plastic bearing material such as nylon or poly-tetra-fluoroethylene.

The invention also consists of a motor vehicle door having a slidable window of the kind described in the penultimate paragraph or the last paragraph and with the opposite edge of the window to that supported by the channel, running in a short bearing mounted at the top of the door body.

The invention will be further described with reference to the accompanying drawings.

Figure 1:
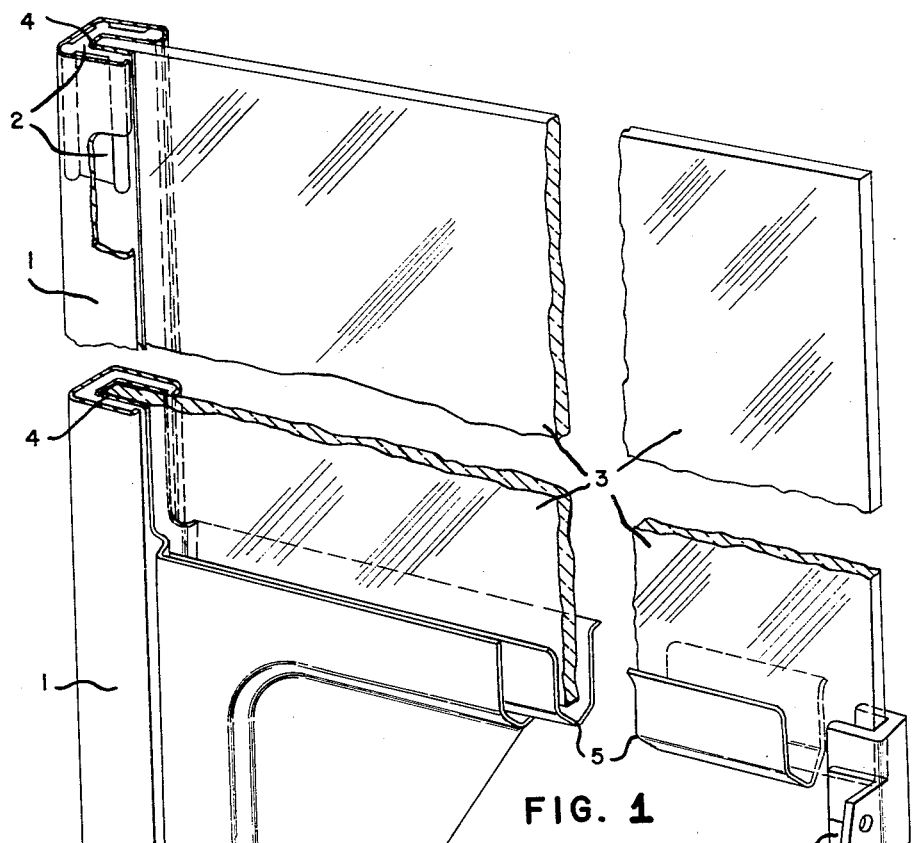
FIGURE 1 is a perspective view of the slidable window.
Figure 2:
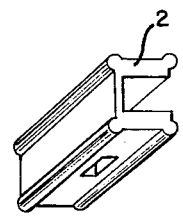
FIGURE 2 is a perspective view of the plastic bearing.

In the drawings, the side support channel 1 has incurling side flanges forming a runway for the channel-shaped plastic bearings 2 which are attached to the upper and lower ends of the glazing channel 4. One side edge of the glass sheet 3 is secured in the glazing channel 4 by means of bitumastic tape or in any other convenient way.

The bottom edge of the glass sheet 3 is secured in a glazing channel 5 which in turn is secured to a triangular gusset 6 forming an extension of the glazing channel 4 sliding in the side support channel 1.

The free side edge of the glass sheet 3 is slidable in a short plastic bearing 7 secured to the door body.

Figure 3:
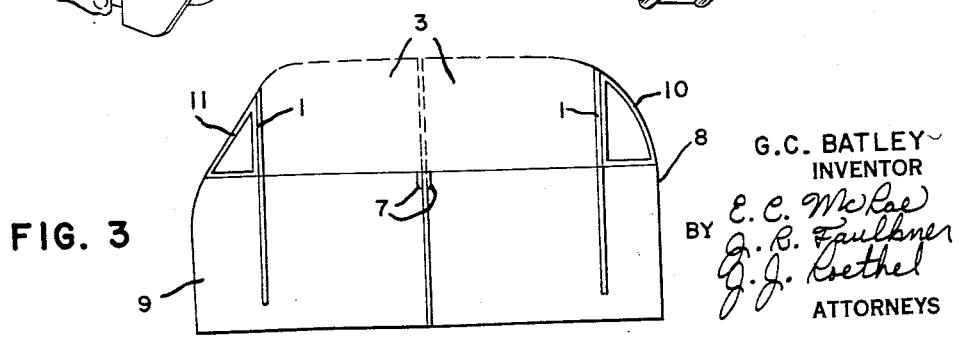
FIGURE 3 is a diagrammatic elevation of a front and rear door assembly according to the invention.

One application as shown in FIGURE 3 has two motor vehicle doors 8 and 9 with windows 10 and 11 supported on one side by the respective side support channels 1 of the arrangement of FIGURE 1.

Each of the slidable glass sheets is supported in its respective side support channel 1 along one side and at the other by the short plastic bearings 7 secured adjacent the top of the door body.

Various modifications may be made in accordance with the invention.

It will be understood that the invention is not to be limited to the exact construction shown and described, but that various changes and modifications may be made without departing from the spirit and scope of the invention, as defined in the appended claims.

What is claimed is:
1. In a vehicle body having a door structure mounted thereon, the upper horizontal edge of said door structure defining the lower edge of a window opening in said body, a side support channel at one side of said door structure, said side support channel comprising an elongated member extending from within said door structure to a point above said upper horizontal edge and defining a vertical edge of said window opening, a window, a glazing channel secured to said window along one vertical edge thereof, said glazing channel extending below the lower horizontal edge of said window, and spaced channel-shaped bearing means secured over said glazing channel adjacent the upper and lower ends thereof and slidably engaged within said side support channel, said side support channel being of sufficient length so that said bearing means guide said window from end to end thereof in both fully opened and fully closed position.

2. In a vehicle body having a door structure mounted thereon, the upper horizontal edge of said door structure defining the lower edge of a window opening in said body, a side support channel at one side of said door structure, said side support channel comprising an elongated member extending from within said door structure to a point above said upper horizontal edge and defining a vertical edge of said window opening, a window, a glazing channel secured to said window along one vertical edge thereof, said glazing channel extending below the lower horizontal edge of said window, spaced channel-shaped bearing means encompassing said glazing channel adjacent the upper and lower ends thereof and slidably engaged within said side support channel, and means retaining said bearing means against displacement from said side support channel in a direction longitudinally of said window, said side support channel being of sufficient length so that said bearing means guide said window from end to end thereof in both fully opened and fully closed position.

3. In a vehicle body having a door structure mounted thereon, the upper horizontal edge of said door structure defining the lower edge of a window opening in said body, a side support channel at one side of said door structure, said side support channel comprising an elongated member extending from within said door structure to a point above said upper horizontal edge and defining a vertical edge of said window opening, a window, a glazing channel secured to said window along one vertical edge thereof, said glazing channel being elongated to extend below the lower horizontal edge of said window, spaced channel-shaped bearing means fitted over said glazing channel adjacent the upper and lower ends thereof and slidably engaged within said side support channel, means retaining said bearing means against withdrawal from said side support channel in a direction longitudinally of said window, said side support channel being of sufficient length so that said bearing means guide said window from end to end thereof in both fully opened and fully closed position, and means slidably guiding the opposite vertical edge of said window, said last mentioned means comprising a bearing means mounted within said door structure adjacent said upper horizontal edge thereof.

4. In a vehicle body having a door structure mounted thereon, the upper horizontal edge of said door structure defining the lower edge of a window opening in said body, a side support channel at one side of said door structure, said side support channel comprising an elongated member extending from within said door structure to a point above said upper horizontal edge and defining a vertical edge of said window opening, a window, a first glazing channel secured to said window along one vertical edge thereof, said first glazing channel being elongated to extend below the lower horizontal edge of said window, a second glazing channel secured to said lower horizontal edge of said window, gusset means on said first glazing channel forming an extension thereof underlying and supporting said second glazing channel, spaced channel-shaped bearing means fitted over said first glazing channel adjacent the upper and lower ends thereof and slidably engaged within said side support channel, means retaining said bearing means against displacement from said support channel in a direction longitudinally of said window, said side support channel being of sufficient length so that said bearing means guide said window from end to end thereof in both fully opened and fully closed position.

5. In a vehicle body having a door structure mounted thereon, the upper horizontal edge of said door structure defining the lower edge of a window opening in said body, a side support channel at one side of said door structure, said side support channel comprising an elongated member extending from within said door structure to a point above said upper horizontal edge and defining a vertical edge of said window opening, a window, a first glazing channel secured to said window along one vertical edge thereof, said first glazing channel being elongated to extend below the lower horizontal edge of said window, a second glazing channel secured to said lower horizontal edge of said window, gusset means on said first glazing channel forming an extension thereof underlying and supporting said second glazing channel, spaced channel-shaped bearing means positioned over said first glazing channel adjacent the upper and lower ends thereof and slidably engaged within said side support channel, means retaining said bearing means against displacement from said side support channel in a direction longitudinally of said window, said side support channel being of sufficient length so that said bearing means guide said window from end to end thereof in both fully opened and fully closed position, and means slidably guiding the opposite vertical edge of said window, said last mentioned means comprising a bearing means mounted within said door structure adjacent said upper horizontal edge thereof.

References Cited in the file of this patent

UNITED STATES PATENTS

| | | |
|---|---|---|
| 1,251,551 | Maise | Jan. 1, 1918 |
| 1,907,798 | Hardtke | May 9, 1933 |
| 2,078,973 | Reid | May 4, 1937 |
| 2,606,091 | Buchy | Aug. 5, 1952 |
| 2,759,773 | Wilmer | Aug. 21, 1956 |
| 2,893,781 | Hoag | July 7, 1959 |

FOREIGN PATENTS

| | | |
|---|---|---|
| 798,372 | France | Mar. 10, 1936 |
| 193,246 | Great Britain | Feb. 22, 1923 |